United States Patent [19]
Sekiya et al.

[11] Patent Number: 4,737,864
[45] Date of Patent: Apr. 12, 1988

[54] STILL PICTURE RECORDING SYSTEM WITH NOISE DETECTION AND FRAME COUNTING DURING SHIFT FROM REPRODUCTION OF PICTURE IN MOTION TO REPRODUCTION OF STILL PICTURE INCLUDING AN INTERMEDIATE SLOW MOTION MODE

[75] Inventors: Masataka Sekiya, Mito; Hideo Nishijima; Kaneyuki Okamoto, both of Katsuta; Isao Fukushima, Katsuta; Fumiaki Fujii, both of Katsuta; Katsumi Sera; Takashi Furutani, both of Katsuta, all of Japan

[73] Assignees: Hitachi Microcomputer Eng. Co.; Hitachi Video Eng.; Hitachi Ltd., Tokyo, all of Japan

[21] Appl. No.: 831,290

[22] Filed: Feb. 20, 1986

[30] Foreign Application Priority Data

Feb. 20, 1985 [JP] Japan .................................. 60-30373

[51] Int. Cl.$^4$ ........................................... H04N 5/783
[52] U.S. Cl. .................................. 360/10.3; 360/10.1
[58] Field of Search ...................... 360/9.1, 10.1, 10.3, 360/33.1, 14.1, 72.1, 73, 14.2; 369/54; 358/312, 335, 336

[56] References Cited

U.S. PATENT DOCUMENTS

| | | | |
|---|---|---|---|
| 4,306,255 | 12/1981 | Misaki et al. | 360/73 X |
| 4,495,525 | 1/1985 | Uchida et al. | 360/10.3 |
| 4,531,162 | 7/1985 | Tokumitsu | 360/10.3 |
| 4,617,598 | 10/1986 | Tsuruoka et al. | 360/10.3 |
| 4,636,874 | 1/1987 | Hoogendoorn et al. | 360/10.3 |

FOREIGN PATENT DOCUMENTS

| | | | |
|---|---|---|---|
| 56-42476 | 4/1981 | Japan | 360/10.3 |
| 2009998 | 6/1979 | United Kingdom . | |

OTHER PUBLICATIONS

Patent Abstracts of Japan, vol. 5, No. 27(E-46)[699], 2/18/81, of JP-55-151876 and JP-55-151877.
Patent Abstracts of Japan, vol. 6, No. 60(E-102)[938], 4/17/82, of JP 57-2178.

Primary Examiner—Raymond F. Cardillo
Assistant Examiner—Wayne R. Young
Attorney, Agent, or Firm—Antonelli, Terry & Wands

[57] ABSTRACT

A still picture reproducing system for a magnetic recording and reproducing apparatus is disclosed. The system sends one frame in order to shift a reproduction mode from ordinary reproduction to reproduction of a still picture by use of so-called "fine slow", sends one more frame if a noise is detected on a picture at this time, and stops if no noise is detected.

2 Claims, 4 Drawing Sheets

STILL PICTURE RECORDING SYSTEM WITH NOISE DETECTION AND FRAME COUNTING DURING SHIFT FROM REPRODUCTION OF PICTURE IN MOTION TO REPRODUCTION OF STILL PICTURE INCLUDING AN INTERMEDIATE SLOW MOTION MODE

BACKGROUND OF THE INVENTION

This invention relates to a still picture reproducing system for magnetic recording and reproduction, and more particularly to a still picture reproducing system for a magnetic recording and reproducing apparatus which system is suitable for obtaining a still picture devoid of noise within a short period.

Conventional magnetic recording and reproducing apparatuses obtain a reproduced still picture devoid of noise by a system disclosed in Japanese Patent Laid-Open No. 43325/1979 (hereinafter referred to as "fine slow"). When this fine slow is used, however, it is necessary to employ a method that enters a still picture reproduction mode after several frames have been sent from the generation of a still picture reproduction command. The fine slow system is a system which sends frames devoid of noise and realizes, without any noise the shift from the still picture reproduction mode to the still picture reproduction of a next frame. Therefore, two different systems are necessary because the tape travelling speed is different between the shift from an ordinary reproduction mode to the reproduction mode of the still picture and the shift from the reproduction mode of the still picture to the reproduction mode of another still picture. Since the fine slow system requires fine adjustment, the production costs are extremely high if these two systems are incorporated in one video tape recorder. For this reason, it has been a customary practice to first stop the tape, then to effect the fine slow operation for several frames and thereafter to enter the reproduction mode of the still picture when the mode is changed from the ordinary reproduction mode to the reproduction mode of the still picture.

As described above, it has not been possible in accordance with the prior art technique to immediately reproduce the still picture when it is desired to obtain a particular picture from the ordinary reproduction mode. In order to satisfy such a requirement, it has been necessary to use various control circuits and fine adjustment.

SUMMARY OF THE INVENTION

The present invention is directed to provide a still picture reproducing system for a magnetic recording and reproducing apparatus which system is simple in construction, does not require any adjustment but can instantaneously change the reproduction mode from an ordinary reproduction mode to a reproduction mode of a still picture.

The above object can be accomplished by the present invention which provides a still picture reproducing system comprising intermittent slow motion reproduction means; noise position detection means which detects the drop position of the level of the signal reproduced from a magnetic tape during the stop period in the intermittent slow motion reproduction; and means which determining that the noise detection position does not exist within a predetermined range and stops the intermittent slow motion reproduction means.

Since the present invention makes it possible to obtain a desired reproduced still picture devoid of noise by sending a minimum necessary number of frames, one can instantaneously obtain the reproduced still picture of a desired picture while viewing a motion picture.

DESCRIPTION OF THE PREFERRED EMBODIMENTS

Figure 1:
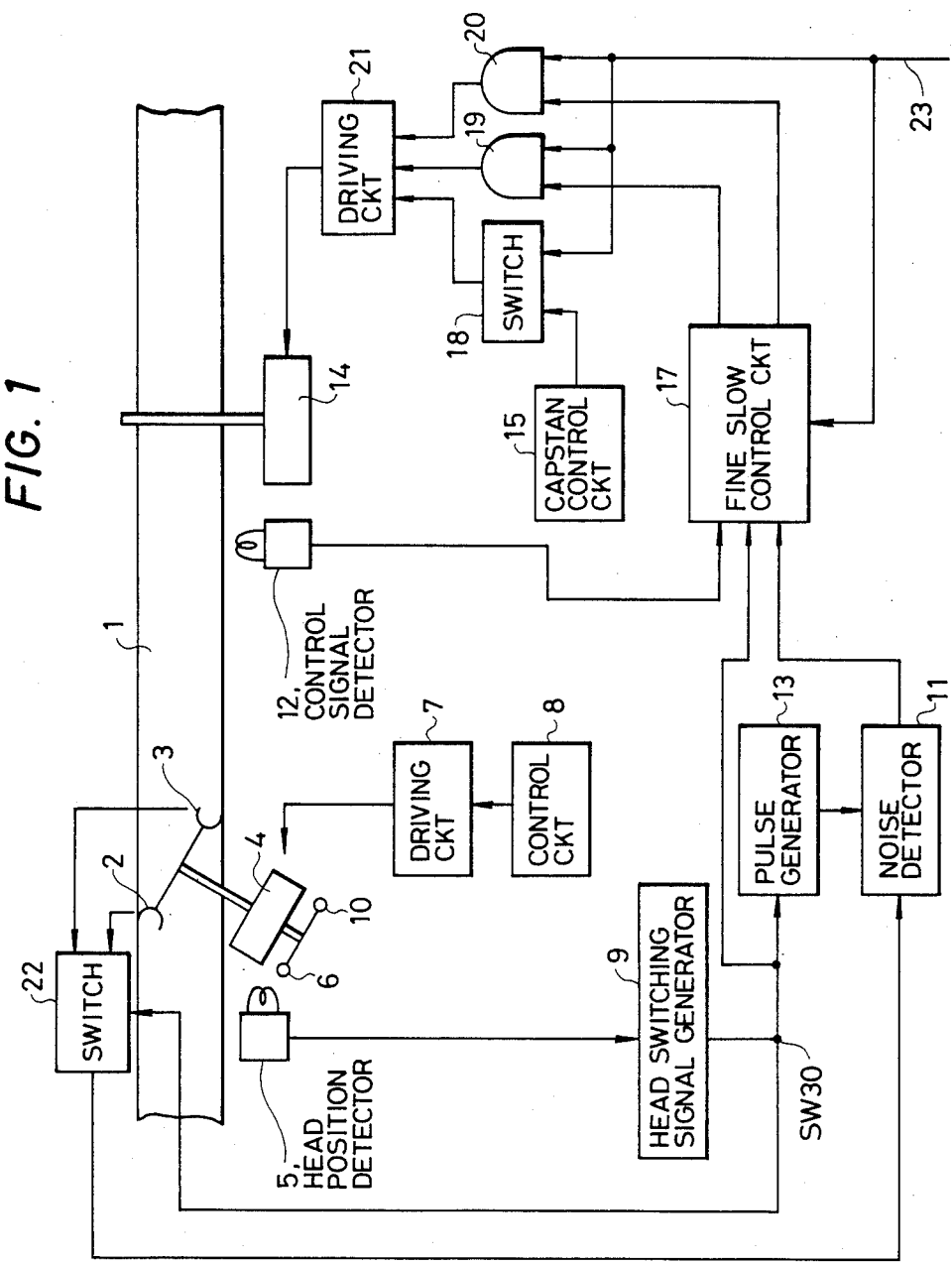
FIG. 1 is a block diagram showing a still picture reproducing system in accordance with one embodiment of the present invention.

Hereinafter, a first embodiment of the present invention will be described with reference to FIG. 1 of the accompanying drawings. In the drawing, reference numeral 1 represents a magnetic tape; 2 and 3 denote video heads; 4 denotes a rotary drum; 5 denotes a video head position detector; 6 and 10 denote magnets; 7 and 21 denote driving circuits; 8 denotes a drum control circuit; 9 denotes a head switching signal generator; 11 denotes a noise detector; 12 denotes a control signal detector; 13 denotes a pulse generator: 14 denotes a capstan; 15 denotes a capstan control circuit; 17 denotes a fine slow control circuit; 18 and 22 denote switches; 19 and 20 denote AND gates; and 23 denotes a voltage signal.

Next, the operation of this circuit will be described. First of all, the rotary drum 4 and the capstan 14 are controlled by the drum control circuit 8 and the capstan control circuit 15 through the driving circuits 7 and 21, respectively, and are assumed to rotate at a constant speed. The video heads 2, 3 rotate with the rotary drum 4 and alternately reproduce the signals recorded on the magnetic tape 1. The magnets 6, 10 represent fitting positions of the video heads 2,3, respectively.

The magnets 6, 10 and the video head position detector 5 induce voltage signals. The voltage signal produces a control signal for the switch 22 (hereinafter this control signal is referred to as "SW 30") in the head switching signal generator 9. SW 30 is inputted to the switch 22 and puts the reproduction signals from the video heads 2, 3 to one signal (hereinafter this signal is referred to as an "envelope"). The envelope is applied to the noise detector 11, and is converted to a pulse after its level drop is detected. At this time, the signal from the pulse generator 13 inhibits noise detection of the portions which do not prove to be a picture on a television picture screen. Pulsation at this portion is effected by the pulse generator 13 using SW 30.

Now, it will be assumed that the user of the video tape recorder issues the command of still picture reproduction and a signal voltage 23 changes from a low level to a high level. It will be assumed also that when the signal voltage 23 is at the low level, the fine slow control circuit 17 has been initialized. When the signal voltage 23 changes to the high level, the switch 18 is turned off to fix a low level, and the outputs of the AND gates 19, 20 permit the passage of the output of the fine slow control circuit 17. Therefore, the fine slow control circuit 17 controls the capstan 14 through the driving circuit 21.

It will be hereby assumed that when the signal voltage 23 changes from low to high, noise develops on the television picture. The envelope of the portion corresponding to the noise at this time drops to the low level. Therefore, the noise detector 11 outputs the pulse corresponding to this level drop portion. This pulse actuates the fine slow control circuit 17 and drives intermittently the capstan 14. This operation is continued until the level drop of the envelop is no longer detected.

If the level drop of the envelope is not detected at the point of time when the signal voltage 23 changes from the low level to the high level, no noise exists on the television picture, and hence intermittent driving of the capstan 14 is not necessary. At this time, the fine slow control circuit 17 is not actuated.

Figure 2:
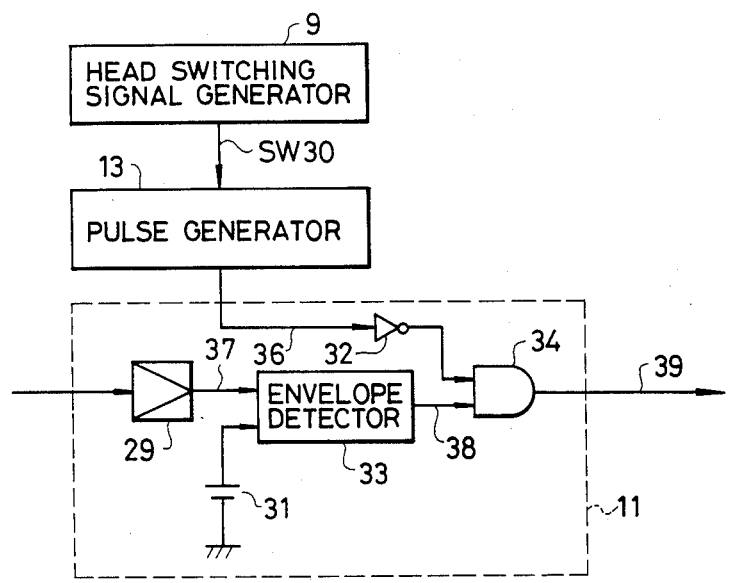
FIG. 2 is a block diagram showing an example of the noise position detector used in the present invention.

Next, the noise detector 11 will be explained in further detail with reference to FIG. 2. In the drawing, reference numeral 29 represents an amplifier; 31 denotes a reference voltage; 32 denotes an inverter; 33 denotes an envelope detector; 34 denotes an AND gate; and SW 30 and 36 to 39 denote signal voltages.

Figure 3:
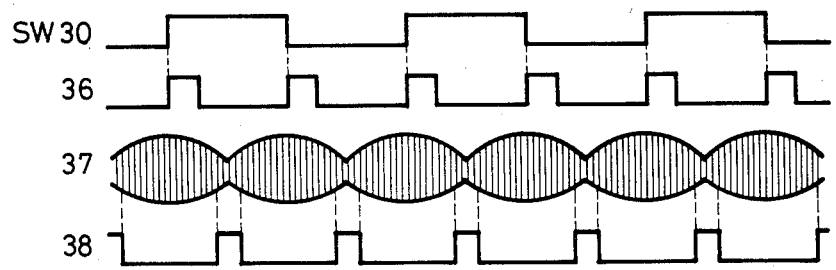
FIG. 3 is a waveform diagram at each portion of the circuit shown in FIG. 2.

FIG. 3 is a waveform diagram at the principal portions of FIG. 2, and the circuit operation will be described with reference to these drawings. The head switching signal generator 9 generates SW 30. This signal SW 30 turns the output signals of the video heads 2, 3 into one continuous signal, and is generated so that the switch 22 is changed over at those portions which do not prove to be a picture on the television picture. The pulse generator 13 produces the pulse using this signal SW 30 at those portions which do not prove to be a picture on the television picture as represented by signal 36.

The envelope is amplified by the amplifier 29 and is compared with the reference voltage 31 by the envelope detector 33. The level drop portion of the envelope is outputted as the pulse as represented by the signal 38. The logical sum of the signal 38 and an inversed signal obtained by inversing the signal 36 by the inverter 32 is calculated by the AND gate 34. The output signal 39 of the AND gate 34 is at the high level only when the noise exists on the television picture.

Figure 4:
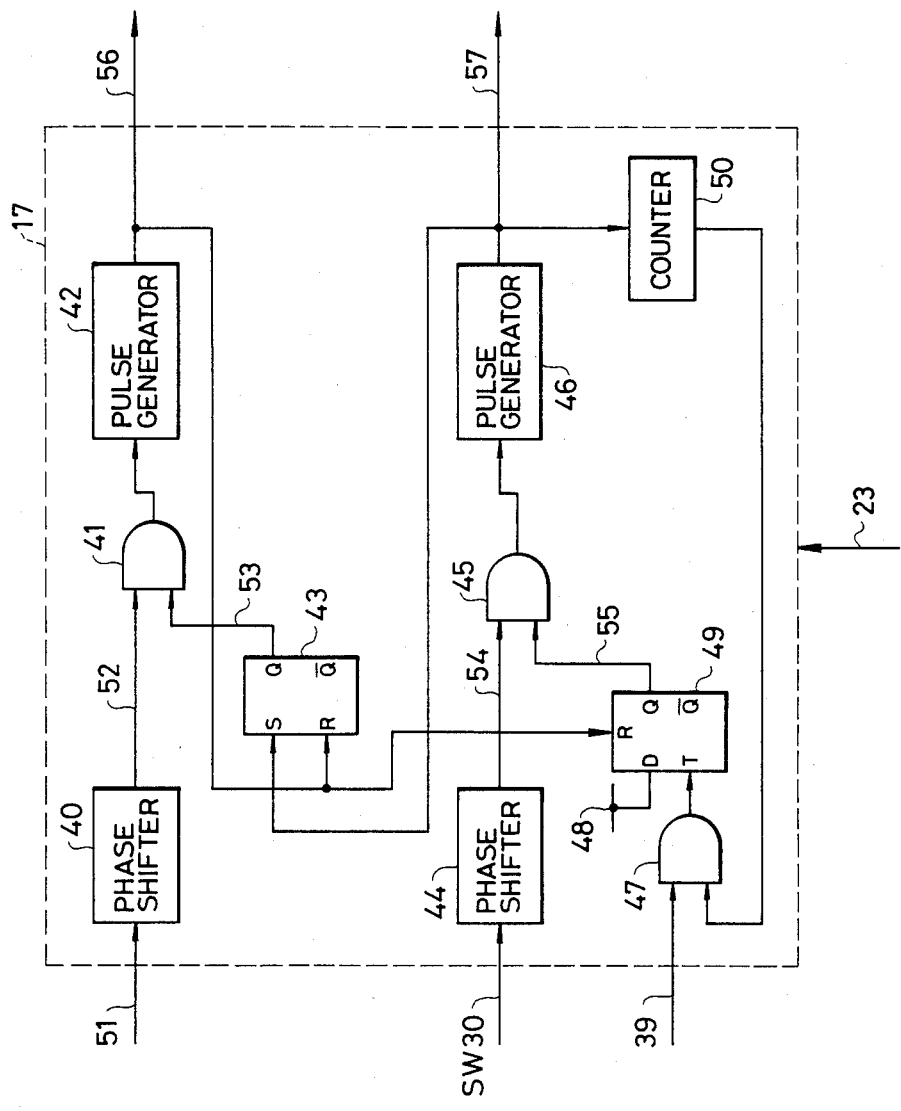
FIG. 4 is a block diagram showing an example of the fine slow control circuit used in the present invention.
Figure 5:
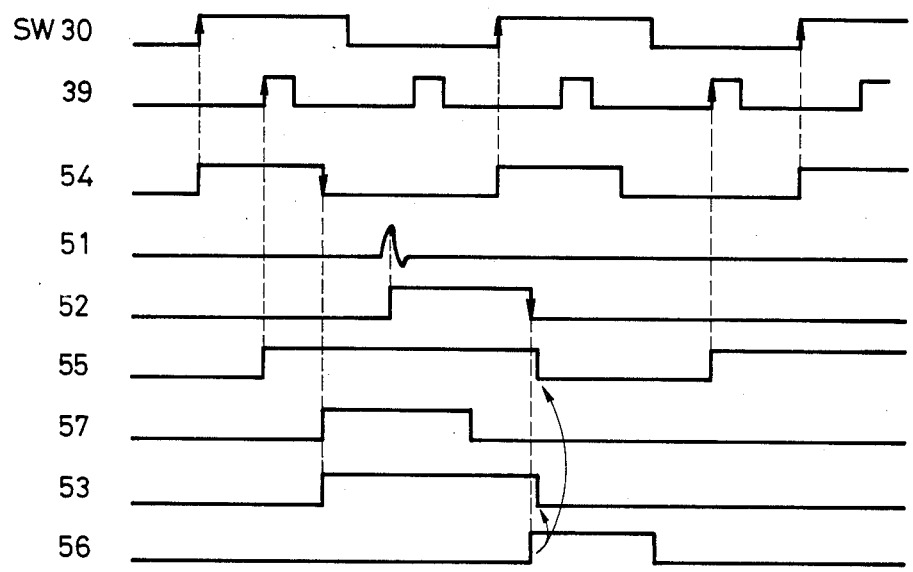
FIG. 5 is a waveform diagram at principal portions of the circuit shown in FIG. 4.

Next, the fine slow control circuit 17, which operates upon receiving the output of the AND gate 34, will be explained with reference to FIG. 4. In the drawing, reference numerals 40 and 44 represent phase shifters; 41, 45 and 47 denote AND gates; 42 and 46 denote pulse generators; 43 denotes an RS flip-flop; 48 denotes $V_{cc}$; 50 denotes a counter; and 51 to 57 denote signal voltages. FIG. 5 is a waveform diagram at the principal portions of the circuit shown in FIG. 4 and the circuit operation will be explained with reference to these drawings.

A signal 54 is obtained from the signal SW 30 by the phase shifter 44. In this case, the signal 54 may be generated either at the rise or fall of the signal SW 30. A signal 52 is generated from the output signal 51 of the control signal detector 12 by use of the phase shifter 40. When the still picture reproduction command signal 23 is at the low level, all of the RS flip-flop 43, the D flip-flop 49 and the counter 50 are reset. Therefore, the outputs 53, 55 of the RS flip-flop and D flip-flop are at the low level. The output of the counter 50 is at the high level.

It will be now assumed that the command of still picture reproduction is issued and the signal voltage 23 changes from the low to the high level. When the noise exists on the television picture, the output signal 39 of the noise detector generates the pulse, so that this pulse passes through the AND gate 47 and triggers the D flip-flop 49. Since the data terminal (D terminal) of the D flip-flop is connected to the highest potential $V_{cc}$ 48 operating the logic of this system, the Q output reaches the high level due to the trigger described above. The Q output (signal voltage 55) is applied to the AND gate 45 and lets it pass the signal 54. The pulse generator 46 generates the pulse (signal voltage 57) at the fall of the signal 54. The signal 57 accelerates forwardly the capstan 14. Since the capstan 14 is driven and the magnetic tape 1 is caused to move, the control signal recorded on the magnetic tape 1 is detected by the control signal detector 12, which outputs the signal 51.

Then, the signal 52 is generated from this signal 51 and is applied to the AND gate 41. On the other hand, since the Q output (signal voltage 53) of the RS flip-flop is raised to the high level by the signal 57, the signal 52 is applied to the pulse generator 42. The pulse generator 42 generates the pulse such as represented by the signal voltage 56, at the fall of the signal 52. The signal 56 rotates reversely and brakes rapidly the capstan. The signal 56 resets the RS flip-flop 43 and the D flip-flop 49. When the signal voltage 39 becomes the pulse even after the signal 57 drops to the low level, the operation described above is repeated. Therefore, the intermittent feed of the tape is continued until no noise exists any longer.

As described above, the intermittent feed of the tape is effected until no noise exists any longer on the television picture, but when no noise exists after the command of reproduction of the still picture is issued, reproduction of the still picture is made immediately.

It will be assumed that a large flaw exists on the magnetic tape 1. Then, the level drop of the envelope cannot be eliminated irrespective of the repetition of the intermittent feed of the tape, and the operation described above is repeated permanently. Therefore, it is necessary to prevent the system from operation after the intermittent feed of the tape is effected several times. To this end, the counter 50 counts a predetermined number of the pulses of the signal 57 and after the intermittent feed of the tape is effected a predetermined number of times, the output of the counter 50 is set to the low level. According to this arrangement, the output of the AND gate 47 becomes always low and hence the system does not operate.

Though the description given above illustrates an example where the number of pulses of the signal 57 is counted, it is also possible to count the number of pulses of the signal 51 or 56, and it would be obvious to those skilled in the art that any signals representing the number of times of the intermittent feed of the tape can be employed. Furthermore, though the description given above illustrates the case where the operation of the system is stopped by inputting the output from the counter 50 to the AND gate 47, it can be effected similarly by resetting the D flip-flop 49. Obviously, the signal may be applied to any position of the system so long as it can essentially stop the operation of the system.

In accordance with the conventional system, the intermittent feed of the tape is effected and after several frames have been sent, reproduction of the still picture is started no matter if the noise exists or not. In contrast, in accordance with the present invention, reproduction of the still picture can be made immediately without sending any frame if no noise exists.

As additional means, the present invertion synchronizes the command of reproduction of the still picture with the signal SW 30 or the control signal. According to this method, the positions at which the video heads 2, 3 trace the track patterns recorded on the magnetic tape 1 become substantially constant after the shift from ordinary reproduction to reproduction of the still picture. Therefore, the possibility of stop without any noise after the shift from ordinary reproduction to reproduction of the still picture can be drastically increased by generating a command timing of reproduction of the still picture from the signal SW 30 or the control signal. Further additionally, the possibility of noise elimination can be further improved by applying a brake signal to the driving circuit 21 after the command of reproduction of the still picture in order to absorb any deviation of tape tension.

What is claimed is:

1. A still picture reproducing system for a magnetic recording and reproducing apparatus comprising:

means for sequentially recording video signals in the unit of one field as oblique tracks on a magnetic tape;

slow motion reproduction means for intermittently reproducing the recorded video signals in the unit of said recording track, said intermittent slow motion reproduction means being used in a shift period from ordinary reproduction to reproduction of a still picture;

noise position detection means for detecting the drop position of a signal level reproduced from said magnetic tape during the intermittent slow motion reproduction;

means for judging that said noise detection position does not exist at least within a predetermined range, and for stopping said intermittent slow motion reproduction means; and a counter for counting the number of frames sent by said intermittent slow motion reproduction means, said intermittent slow motion reproduction means being stopped when said counter reaches a predetermined count value.

2. A still picture reproducing system for a magnetic recording and reproducing apparatus comprising:

means for sequentially recording video signals of one field as oblique tracks on a magnetic tape;

slow motion reproduction means for reproducing said video signals during a shift period from ordinary reproduction to reproduction of a still picture;

noise position detection means for detecting a position of a drop in a signal level produced from said magnetic tape during reproduction by said slow motion reproduction means;

means for determining whether said noise detection position is within a predetermined range and for stopping reproduction by said slow motion reproduction means when said noise detection position is not within said predetermined range; and counter means for counting the number of frames fed through said slow motion reproduction means and for stopping reproduction by said slow motion reproduction means when said counter means reaches a predetermined count value.

* * * * *